United States Patent
Sellhorn et al.

(10) Patent No.: US 7,175,379 B2
(45) Date of Patent: Feb. 13, 2007

(54) BATTERY CHANGING DEVICE FOR AN INDUSTRIAL TRUCK

(75) Inventors: Gerhard Sellhorn, Hamburg (DE); Christof-Walter Funk, Schiphorst (DE)

(73) Assignee: Still GmbH, Hamburg (DE)

( * ) Notice: Subject to any disclaimer, the term of this patent is extended or adjusted under 35 U.S.C. 154(b) by 258 days.

(21) Appl. No.: 10/677,758

(22) Filed: Oct. 2, 2003

(65) Prior Publication Data

US 2004/0136815 A1 Jul. 15, 2004

(30) Foreign Application Priority Data

Oct. 4, 2002 (DE) ................. 102 46 221

(51) Int. Cl.
*B60P 3/00* (2006.01)
(52) U.S. Cl. ................. 414/607; 187/237; 414/345
(58) Field of Classification Search ........... 414/340, 414/345, 391, 392, 395, 400, 607; 104/34; 187/237
See application file for complete search history.

(56) References Cited

U.S. PATENT DOCUMENTS

| | | | | |
|---|---|---|---|---|
| 3,105,604 A | * | 10/1963 | Quayle | 414/607 |
| 3,122,244 A | * | 2/1964 | Corso | 414/462 |
| 3,223,259 A | * | 12/1965 | Nicholson | 414/349 |
| 3,327,875 A | * | 6/1967 | Goodacre | 414/347 |
| 3,669,292 A | * | 6/1972 | Tuura | 414/607 |
| 3,791,544 A | * | 2/1974 | Moses | 414/607 |
| 4,101,038 A | * | 7/1978 | Palma | 104/34 |
| 4,102,273 A | * | 7/1978 | Merkle et al. | 104/34 |
| 4,227,463 A | * | 10/1980 | Pfleger | 104/34 |
| 4,283,164 A | * | 8/1981 | Reaney | 414/396 |
| 4,299,526 A | * | 11/1981 | Smith | 414/392 |
| 4,397,365 A | * | 8/1983 | Harbe et al. | 180/68.5 |
| 4,808,058 A | * | 2/1989 | Carney et al. | 414/343 |
| 5,187,423 A | | 2/1993 | Marton | |
| 5,360,307 A | | 11/1994 | Schemm et al. | |
| 5,452,983 A | | 9/1995 | Parmley, Sr. | |
| 5,508,597 A | | 4/1996 | Parmley, Sr. | |

FOREIGN PATENT DOCUMENTS

| | | |
|---|---|---|
| EP | 030 928 A1 | 6/1981 |
| EP | 1 095 831 A2 | 5/2001 |
| GB | 2 050 310 A | 1/1981 |

\* cited by examiner

*Primary Examiner*—James Keenan
(74) *Attorney, Agent, or Firm*—The Webb Law Firm

(57) ABSTRACT

A handling device is provided for a battery block (1) of an industrial truck having a lateral battery extraction opening. The handling device includes a pallet truck (3) and a battery receptacle (4) mountable on the pallet truck (3). The battery receptacle (4) on the pallet truck (3) can be inserted underneath a battery block (1) that is located in the industrial truck, whereupon the battery block (1) can be lifted and removed from the industrial truck. The battery receptacle (4) has a load-bearing frame by means of which the weight of the battery block (1) can be supported on the tines of the fork of the pallet truck (3). In one development, the handling device includes a battery tray on which the battery block (1) can be set down by the battery receptacle (4) that is located on the pallet truck (3).

7 Claims, 3 Drawing Sheets

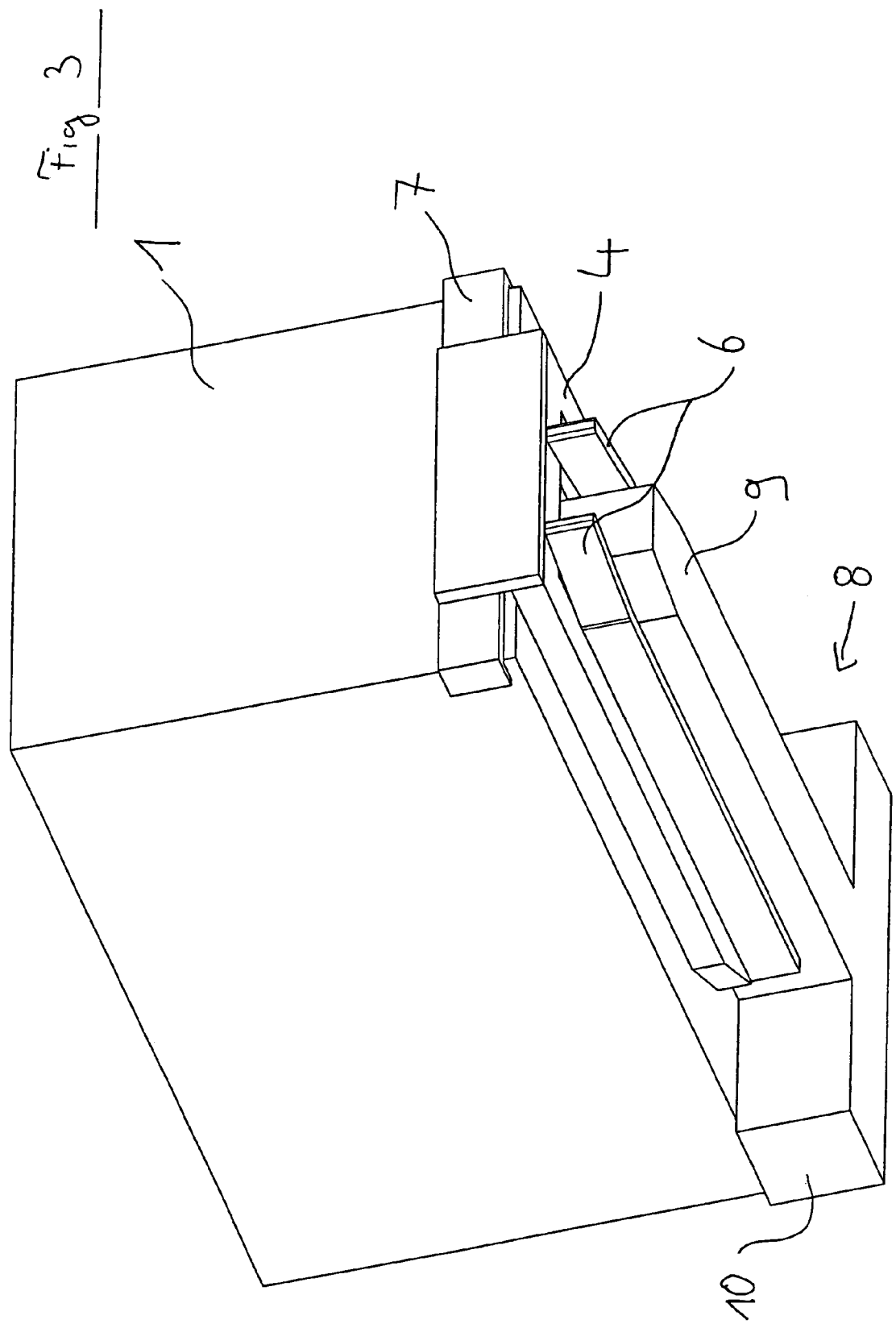

BATTERY CHANGING DEVICE FOR AN INDUSTRIAL TRUCK

CROSS REFERENCE TO RELATED APPLICATION

This application corresponds to German Application No. 102 46 221.6 filed Oct. 4, 2002, which is herein incorporated by reference in its entirety.

BACKGROUND OF THE INVENTION

1. Field of the Invention

This invention relates to a handling device for a battery block of an industrial truck having a lateral opening for the extraction of the battery. The handling device comprises a pallet truck and a battery receptacle that can be placed on the pallet truck.

2. Technical Considerations

A handling device for battery blocks of fork lift trucks is disclosed, for example, in DE 199 52 042 A1. In this case, a battery receptacle provided with a roller conveyor is used. After the lift truck has been positioned so that the battery receptacle is directly next to the fork lift truck, the battery block can be pushed from a roller conveyor that is permanently mounted on the fork lift truck onto the roller conveyor of the battery receptacle.

This handling device is very complex and expensive to manufacture, particularly because the battery compartment of each individual industrial truck must be equipped with a roller conveyor.

Therefore, it is an object of the invention to provide a handling device of the general type described above but which has a simpler construction.

SUMMARY OF THE INVENTION

The invention teaches a battery receptacle configured so that the battery receptacle (mounted on a pallet truck) can be inserted underneath the battery block of an industrial truck, whereupon the battery block can be lifted and moved out of the industrial truck. The pallet truck can be a manually operated pallet truck or an electrically operated pallet truck. The battery compartment of the industrial truck, such as a fork-lift truck or a reach truck, is at least partly open on the bottom. The pallet truck with the battery receptacle of the invention can be inserted underneath the battery block located in the industrial truck. When the battery receptacle is then raised by means of the pallet truck, the battery receptacle comes into contact with the battery block and lifts it. The battery block on the battery receptacle can then be removed from the industrial truck by means of the pallet truck and transported to its destination. A new battery block can be inserted into the industrial truck in the reverse sequence. The system taught by the invention makes it possible to eliminate the previously used roller conveyors altogether. In particular, it is no longer necessary to provide any roller conveyors or other movement devices for the battery block in the industrial truck.

In one constructive realization, the battery receptacle can have a load-bearing frame with which the weight of the battery block can be supported on a fork of the pallet truck. The fork of the pallet truck can have two spaced, e.g., parallel tines. The frame, which forms the load-bearing structure of the battery receptacle, sits directly on the tines of the fork of the pallet truck in this embodiment.

A particularly stable structure can be achieved if the load-bearing frame of the battery receptacle is constructed using rectangular hollow sections, e.g., metal sections. The hollow sections can be connected to one another by any conventional means, such as welding, for example, and can be characterized by their relatively high rigidity. The rectangular shape of the sections provides a flat contact surface of the frame on the forks of the pallet truck, and a flat contact surface of the battery block on the frame.

Fastened to the frame of the battery receptacle can be at least one guide element, with which the battery receptacle (holder) can be fixed in position in the lateral direction relative to the fork of the pallet truck. The guide elements thereby prevent slippage of the battery receptacle on the pallet truck.

Also fastened to the frame of the battery receptacle can be at least one support element, with which the battery receptacle can be set down on the floor or ground by lowering the fork of the pallet truck. The support element(s) make it possible to set the battery block down on the floor together with the battery receptacle. This capability can also be used to prevent undesired movements of the pallet truck when it is carrying the battery block, i.e., to prevent it from rolling away if it is parked on a slope.

The number of individual components can be reduced if the guide element and the support element are formed by a single component.

The battery receptacle can have an adjustable stop for the battery block. The stop determines the depth to which the pallet truck can be inserted underneath the fork lift truck. If the stop, which can have an oblong shape, is oriented perpendicular to the forks of the pallet truck, the stop also makes it easier to hold the battery block in a properly aligned position. If the stop is adjustable, the same battery receptacle can be used for different types of industrial trucks and battery blocks.

In one advantageous development, the handling device comprises a battery tray on which the battery block can be placed by means of the battery receptacle that is located on the pallet truck. The battery block can be placed on the battery tray without the battery receptacle, e.g., to charge the battery block.

In an additional advantageous configuration, the battery tray comprises a longitudinal beam which, while the battery block is being set down, can be between the tines of the fork of the pallet truck and optionally between two support elements of the battery receptacle. The battery block can thus be set down essentially in the center on the longitudinal beam.

To securely prevent the battery block from tipping over laterally, the battery tray can have a crossbeam which, when the battery block is being set down, is located in front of the fork of the pallet truck and underneath the battery block.

It is particularly advantageous if the longitudinal beam and/or the crossbeam are made of wood. The fact that the beams are made of a non-slip material, e.g., wood, which is resistant to battery acid, makes them particularly simple to construct.

BRIEF DESCRIPTION OF THE DRAWINGS

Additional advantages and features of the invention are explained in greater detail below with reference to the exemplary embodiment illustrated in the accompanying schematic figures in which like reference symbols identify like parts throughout:

FIG. 3 shows a battery block on a battery tray in accordance with the invention.

DESCRIPTION OF THE PREFERRED EMBODIMENTS

Figure 1:
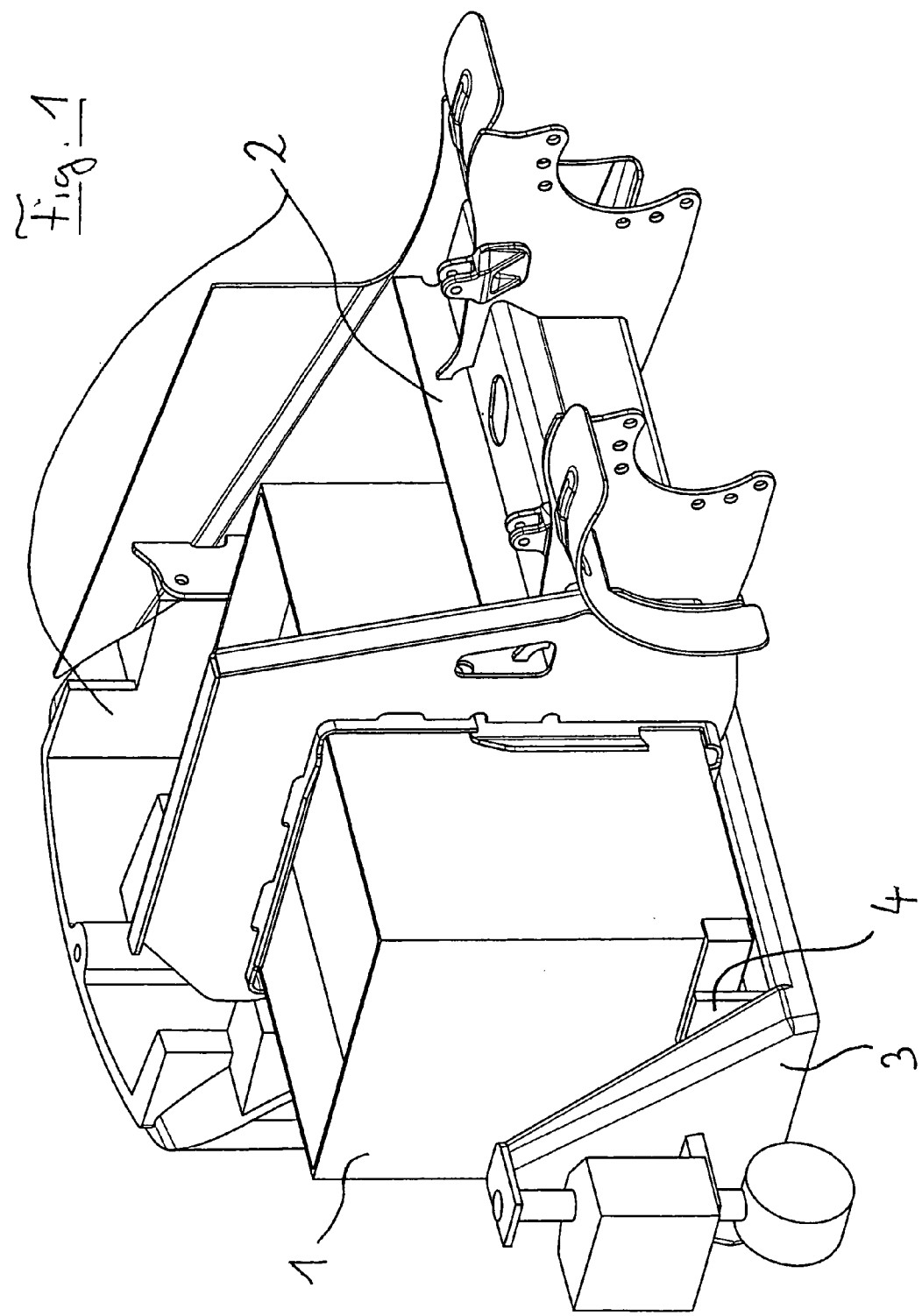
FIG. 1 shows a handling device of the invention.

FIG. 1 shows a handling device of the invention for a battery block 1. The battery block 1 can be removed in the lateral direction from the chassis 2 of an industrial truck which, in this exemplary embodiment, is in the form of a fork lift truck. The handling device comprises a pallet truck 3 having at least one fork. A battery receptacle 4 can be placed on the fork(s). In the illustrated position, the battery block 1 has been raised together with the battery receptacle 4 by means of the pallet truck 3 so that the battery block 1 can be moved relative to the chassis 2.

Figure 2:
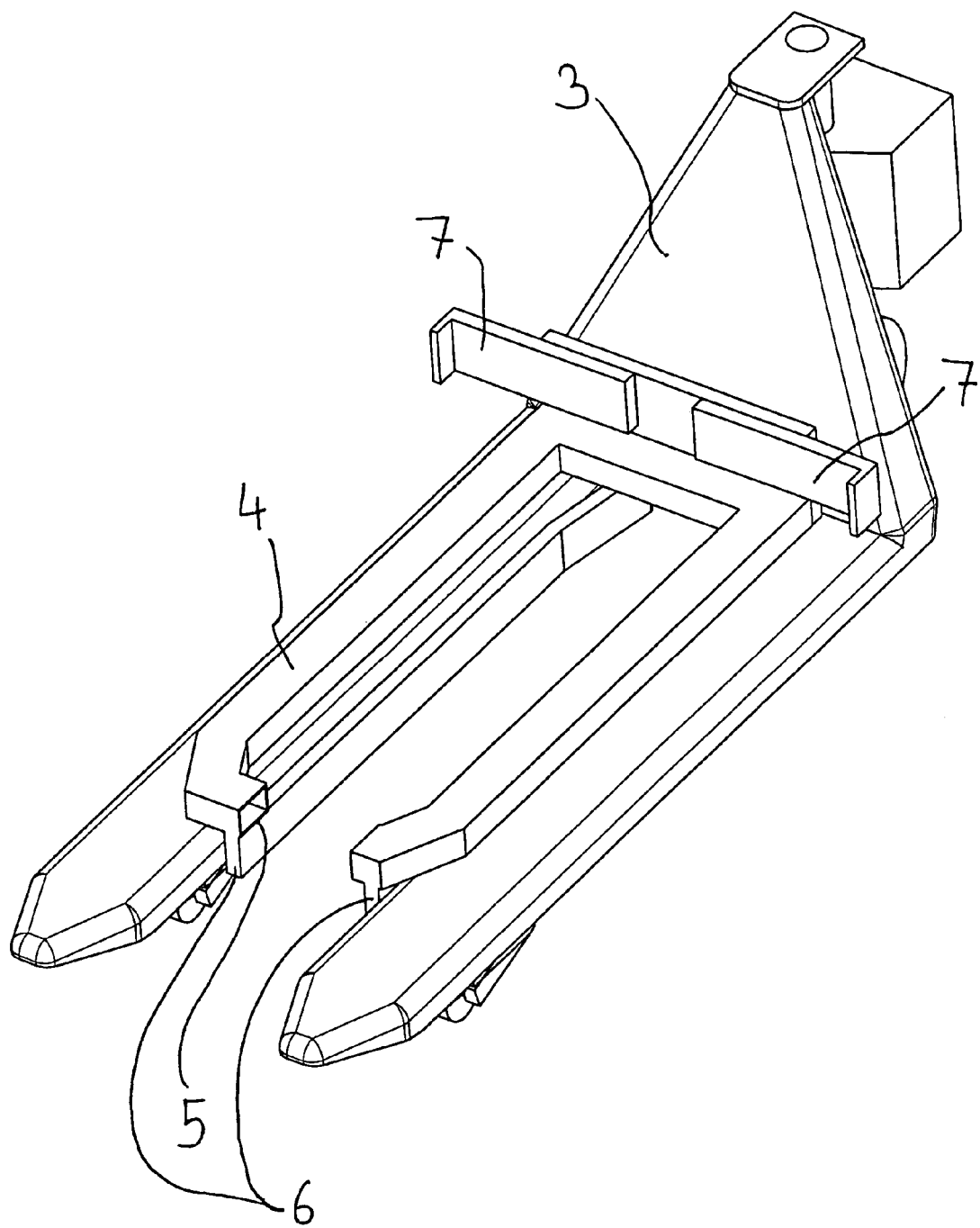
FIG. 2 shows a pallet truck with an attached battery receptacle in accordance with the invention.

FIG. 2 shows an exemplary embodiment of the pallet truck 3 with the battery receptacle 4 on it. The figure shows that the load-bearing frame of the battery receptacle 4 can be made of hollow rectangular tubes or sections 5. On the underside of each of the rectangular sections 5 that run parallel to the tines of the pallet truck 3 there can be a downwardly-directed component 6 which simultaneously acts as a guide element by means of which the battery receptacle 4 can be fixed in the lateral direction on the pallet truck 3, and as a support element by means of which the battery receptacle 4 can be set down on the floor by lowering the fork of the pallet truck 3. At the rear of the battery receptacle 4 there is a stop 7 which defines the depth to which the pallet truck 3 and, thus, the battery receptacle 4, can be inserted underneath an industrial truck. On account of its rectangular shape, the stop 7 can also be used to align the battery block 1 on the battery receptacle 4.

FIG. 3 shows, from diagonally underneath, a battery tray 8, a battery block 1 that has been placed on it, and a battery receptacle 4. The battery tray 8 comprises a longitudinal beam 9 and a crossbar 10. Starting from the illustrated position of the battery block 1, as the battery receptacle 4 is lowered and removed in the lengthwise direction of the longitudinal beam 9, the battery block 1 sits on the battery tray 8 in a stable position. Any lateral tipping of the battery block 1 is securely prevented by the crossbar 10. A battery tray 8 of this type can be provided, for example, in a charging station for battery blocks 1. In a charging station of this type, a plurality of battery trays 8 can be provided next to one another, for example. In that event, it is particularly advantageous if a plurality of parallel longitudinal beams 9 are fastened to a longer crossbeam 10.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A handling device for handling a battery block of an industrial truck having a lateral battery extraction opening and an at least partly open bottom, the handling device comprising:

a pallet truck having at least one fork configured to enter into the lateral battery extraction opening; and a battery receptacle removably mountable on the pallet truck, wherein the battery receptacle includes a load-bearing frame, by means of which the weight of the battery block can be supported on the fork of the pallet truck, wherein the handling device is configured such that the battery receptacle when located on the pallet truck is movable into the at least partly open bottom of an industrial truck underneath a battery block installed in the industrial truck so that the battery block can be lifted and moved laterally out of the industrial truck on the battery receptacle, wherein the battery receptacle includes a stop for the battery block to determine a depth to which the pallet truck can be inserted underneath the industrial truck, wherein the battery receptacle includes at least one guide element fastened to the frame of the battery receptacle, by means of which the battery receptacle can be fixed in position in a lateral direction relative to the fork of the pallet truck, and at least one support element fastened to the frame of the battery receptacle, by means of which support element the battery receptacle can be placed on the floor or the ground by lowering the fork of the pallet truck, wherein the guide element and the support element are formed by a single component, and wherein the guide element and the support element comprise a flat top portion having a bottom configured to extend over a portion of a top of the fork and a downnwardly-directed flat component extending at right angles to the top portion, the top portion and downwardly-directed portion forming an open, inverted L-shaped groove configured to engage an inner portion of the fork.

2. The handling device as claimed in claim 1, wherein the load-bearing frame of the battery receptacle comprises rectangular hollow sections.

3. The handling device as claimed in claim 1, wherein the handling device comprises a battery tray on which the battery block can be placed by means of the battery receptacle located on the pallet truck.

4. The handling device as claimed in claim 3, wherein the battery tray comprises a longitudinal beam which, as the battery block is being set down, is located between spaced tines of the fork of the pallet truck.

5. The handling device as claimed in claim 4, wherein the battery tray comprises a crossbeam which, as the battery block is being set down, is located in front of the fork of the pallet truck and underneath the battery block.

6. The handling device as claimed in claim 5, wherein at least one of the longitudinal beam and the crossbeam are made of wood.

7. The handling device as claimed in claim 3, wherein the battery tray comprises a crossbeam which, as the battery block is being set down, is located in front of the fork of the pallet truck and underneath the battery block.

* * * * *

UNITED STATES PATENT AND TRADEMARK OFFICE
CERTIFICATE OF CORRECTION

PATENT NO. : 7,175,379 B2  
APPLICATION NO. : 10/677758  
DATED : February 13, 2007  
INVENTOR(S) : Sellhorn et al.

Page 1 of 1

It is certified that error appears in the above-identified patent and that said Letters Patent is hereby corrected as shown below:

Column 4, Line 50, Claim 5, "The handling device as claimed in claim 4" should read -- The handling device as claimed in Claim 3 --

Column 4, Line 58, Claim 7, "The handling device as claimed in claim 3" should read -- The handling device as claimed in Claim 4 --

Signed and Sealed this

Nineteenth Day of June, 2007

JON W. DUDAS  
*Director of the United States Patent and Trademark Office*